(12) United States Patent
Fan

(10) Patent No.: US 8,186,508 B2
(45) Date of Patent: May 29, 2012

(54) APPARATUS FOR HOLDING ELECTRONIC DEVICES

(76) Inventor: Eagle Fan, Hsinchu (TW)

( * ) Notice: Subject to any disclaimer, the term of this patent is extended or adjusted under 35 U.S.C. 154(b) by 211 days.

(21) Appl. No.: 12/753,099

(22) Filed: Apr. 2, 2010

(65) Prior Publication Data

US 2011/0240516 A1 Oct. 6, 2011

(51) Int. Cl.
*B65D 85/00* (2006.01)
(52) U.S. Cl. .................. 206/320; 206/762; 206/756
(58) Field of Classification Search .................. 206/320, 206/752, 477, 736, 753, 756, 762, 759; 220/323, 220/324, 326, 827, 830, 833, 829; 224/929, 224/482, 539; 190/102, 114; 312/223.2
See application file for complete search history.

(56) References Cited

U.S. PATENT DOCUMENTS

| | | | | |
|---|---|---|---|---|
| 2,567,564 A * | 9/1951 | Ingraham | | 368/316 |
| 2,627,067 A * | 1/1953 | Rose | | 348/842 |
| 3,162,997 A * | 12/1964 | Schmidt | | 368/276 |
| 4,452,373 A * | 6/1984 | Pearce et al. | | 220/4.22 |
| 4,984,706 A * | 1/1991 | Cadwell et al. | | 312/223.2 |
| 5,632,373 A * | 5/1997 | Kumar et al. | | 206/305 |
| 6,574,834 B2 * | 6/2003 | Fedon | | 16/225 |
| 6,651,857 B1 * | 11/2003 | Tsai | | 225/42 |
| 6,857,538 B2 * | 2/2005 | Lin | | 220/830 |
| 2005/0231930 A1 * | 10/2005 | Jao | | 361/807 |
| 2007/0227923 A1 * | 10/2007 | Kidakarn | | 206/320 |
| 2008/0078776 A1 * | 4/2008 | Guo | | 220/830 |
| 2011/0259789 A1 * | 10/2011 | Fan | | 206/701 |

* cited by examiner

*Primary Examiner* — Steven A. Reynolds
(74) *Attorney, Agent, or Firm* — Lin & Associates IP, Inc.

(57) ABSTRACT

An apparatus for holding an electronic device is provided, including a carrier seat, an upper lid and at least a resilient element. The shape of the holding apparatus is constituted by the upper lid at the top and the carrier seat at the bottom. The carrier seat and the upper lid are engaged by coupling on one side so that the upper lid can rotate along the coupling side to open or close. The both ends of the resilient element are engaged to the upper lid and the carrier seat, respectively, to provide a force so that the upper lid and the carrier seat can incline towards each other. The facing surface of the carrier seat has a positioning element and the facing surface of the upper lid has a maintaining element. The bottom of the carrier seat includes an anti-slip layer.

11 Claims, 10 Drawing Sheets

APPARATUS FOR HOLDING ELECTRONIC DEVICES

FIELD OF THE INVENTION

The present invention generally relates to a holding apparatus, and more specifically to an apparatus for holding electronic device and providing sun shielding for the electronic device.

BACKGROUND OF THE INVENTION

The holders for portable electronic device for vehicular use mostly hold the electronic device by clamping both left and right sides. As the user usually does not need to view the information displayed on the electronic device when using, this type of clamping is acceptable. However, if the electronic device is, such as, GPS or smart phone, and the user needs to view the information display on the device constantly, this type of holder must allow angle adjustment after clamping the electronic device so that the user can view the display of the device. When the viewing angle is incorrect or the ambient light is too strong, the user usually finds it difficult to read the information on the display.

Therefore, it is imperative to devise an apparatus for holding electronic device as well as providing sun shielding effect to enable the reading of the display information.

SUMMARY OF THE INVENTION

The primary object of the present invention is to provide an apparatus for holding electronic device having the advantages of high portability, sun-shielding and ease of clamping. The holding apparatus is to clamp the top and the bottom edges of the electronic device so that the electronic device is seated inside the holding apparatus with a tilt angle. At this point, the elements of the holding apparatus are distributed surrounding the circumference of the electronic device. With some element capable for shielding sunshine directly shone the display of the electronic device, the user can read the information on the display of the electronic device more easily.

Another object of the present invention is to provide an apparatus for holding electronic device so that the overall center of mass is low when holding the electronic device. Combined with the anti-slip design at the bottom, the holding apparatus will not shift around by the shaking movement of the vehicle during driving.

Yet another object of the present invention is to provide an apparatus for holding electronic device with simple structure and ease to use, applicable to smart phone that can be used both vertically and horizontally. The holding apparatus of the present invention mainly clamps the smart phone in the horizontal usage scenario.

To achieve the above objects, the holding apparatus of the present invention includes a carrier seat, an upper lid and at least a resilient element. The shape of the holding apparatus is constituted by the upper lid at the top and the carrier seat at the bottom. The carrier seat and the upper lid are engaged by coupling on one side so that the upper lid can rotate along the coupling side to open or close. The both ends of the resilient element are engaged to the upper lid and the carrier seat, respectively, to provide a force so that the upper lid and the carrier seat can incline towards each other. The facing surface of the carrier seat has a positioning element and the facing surface of the upper lid has a maintaining element. The location of the positioning element is on the side away from the coupling side of the carrier seat and the location of the maintaining element is on the side away from the coupling side of the upper lid. The positioning element and the maintaining element can prevent the shifting of the electronic device when clamping the electronic device. The bottom of the carrier seat includes an anti-slip layer.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
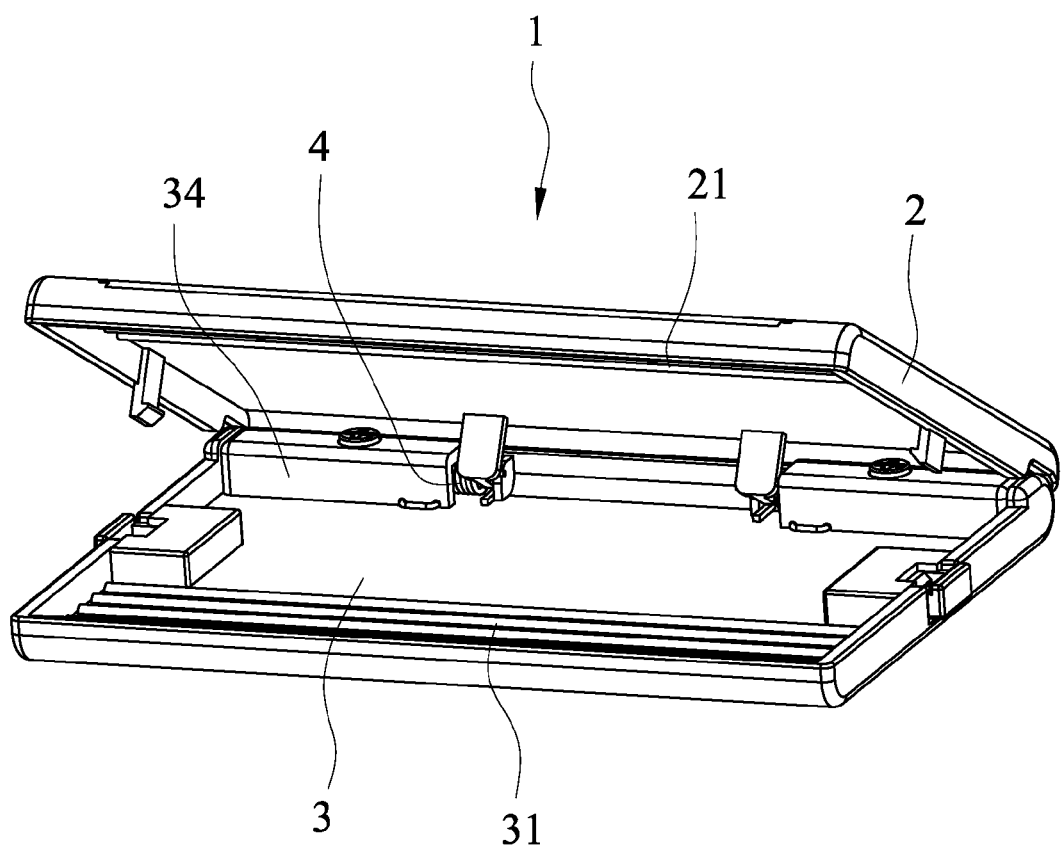
FIG. 1 shows a schematic view of the first embodiment according to the present invention.

FIG. 1 shows a schematic view of an apparatus for holding electronic device according to the invention. Holding apparatus 1 includes an upper lid 2, a carrier seat 3 and at least a resilient element 4. The shape of the main body of holding apparatus 1 is constituted by upper lid 2 at the top and carrier seat 3 at the bottom. Carrier seat 3 and upper lid 2 are engaged by coupling on one side so that upper lid 2 can rotate along the coupling side to open or close. Both ends of resilient element 4 are engaged to upper lid 2 and carrier seat 3, respectively, to provide a force so that upper lid 2 and carrier seat 3 can incline towards each other. In this manner, when an electronic device is held by holding apparatus 1, the electronic device is seated between upper lid 2 and carrier seat 3 with a tile angle.

Figure 2:
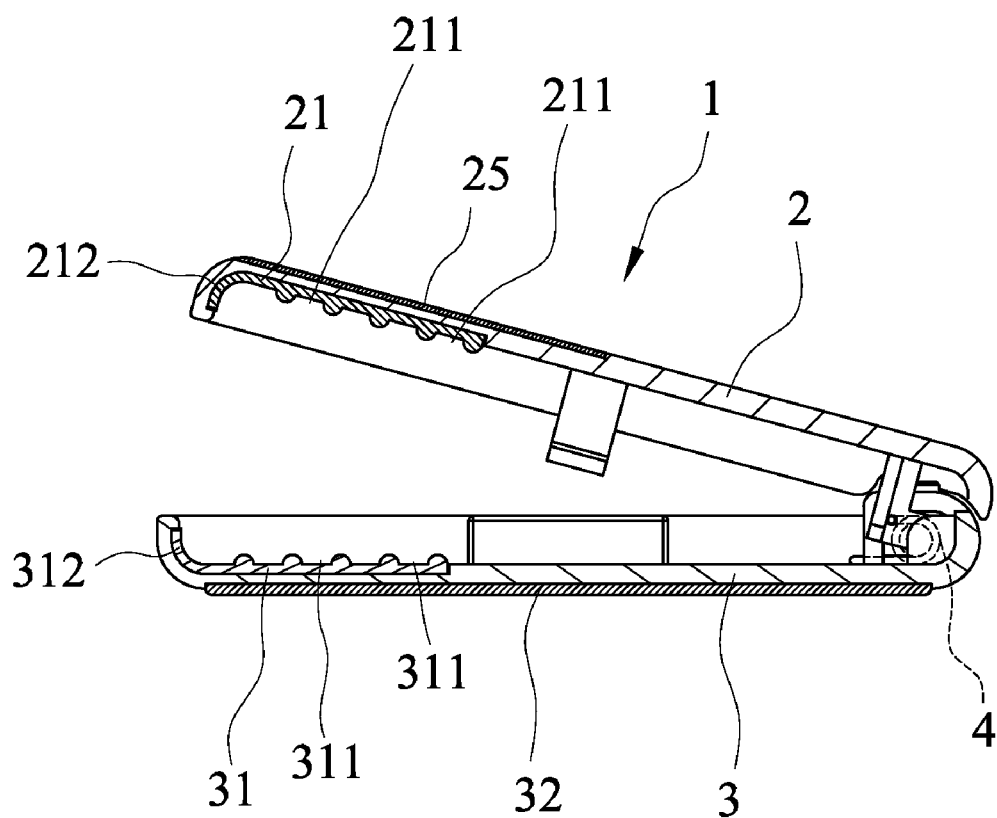
FIG. 2 shows a cross-section view of the present invention.

As the holding apparatus of the present invention is mainly for vehicular use, the holding apparatus must be able to stay unmoved during driving, while clamping the electronic device tightly even when the vehicle is shaking on a bumpy road condition. Therefore, each element of holding apparatus 1 must be designed specifically to meet such criteria. The following describes the elements in details. In the present embodiment, carrier seat 3 is a rectangular tray opening upward. The shape and the size of upper lid 2 are similar to carrier seat 3 so that when upper lid 2 closes on carrier seat 3, holding apparatus 1 has the shape of a closed thin box. As shown in FIG. 1 and FIG. 2, the facing surface of carrier seat 3 has at least a positioning element 31 and the facing surface of upper lid 2 has at least a maintaining element 21. When clamping an electronic device, the bottom edge of the electronic device touches positioning element 31 of carrier seat 3, and the top edge of the electronic device touches maintaining element 21 of upper lid 2. With positioning element 31 and maintaining element 21, the electronic device will not shift when clamped by holding apparatus 1 during driving. In addition, to further enhance the holding, the clamping location of holding apparatus 1 is on the side away from the coupling side. Hence, the location of maintaining element 21 is on the side away from the coupling side of upper lid 2, and is made of anti-slip material, such as, anti-slip cloth, foam or adhesive soft plastic pad. In the present embodiment, the exposed surface of maintaining element 21 is wavy, with a plurality of valleys 211 between peaks. Valleys 211 can help the electronic device avoid shifting when clamped. With valleys 211 at different locations to select from, maintaining element 21 can generate different tilted angles when holding the electronic device.

The location of positioning element 31 is on the side away from the coupling side of carrier seat 3. The object of positioning element 31 is to prevent the shifting of the electronic device when clamped. In the present embodiment, the positioning element 31 is made of anti-slip material, such as, anti-slip cloth or adhesive soft plastic pad, to increase friction for clamping and to avoid abrasion damaging the surface of the electronic device. The exposed surface of positioning element 31 is also wavy, with a plurality of valleys 311 between peaks. Valleys 311, combined with valleys 211, holding apparatus 1 can hold the electronic device with different tiling angle to enable ease reading of the information on the display. In addition, to prevent shifting for vehicular use, the bottom of carrier seat 3 includes an anti-slip layer 32, made of anti-slip material, such as, anti-slip cloth or adhesive soft plastic pad. Furthermore, anti-slip layer 32 can also be distributed on the bottom, instead of covering the entire bottom of carrier seat 3, such as, at the four corners of the bottom.

In the present invention, maintaining element 21 and positioning element 31 are to prevent the electronic device from shifting when clamped, and do not limit the scope of the present invention. Any other designs for similar purpose are all within the scope of the present invention. As shown in FIG. 2, a part of maintaining element 21 and positioning element 31 forms a bending segment 212 and bending segment 312 to prevent electronic device from slipping out of the opening of holding apparatus 1. Maintaining element 21 and positioning element 31 can both be made of anti-slip material.

Figure 3:
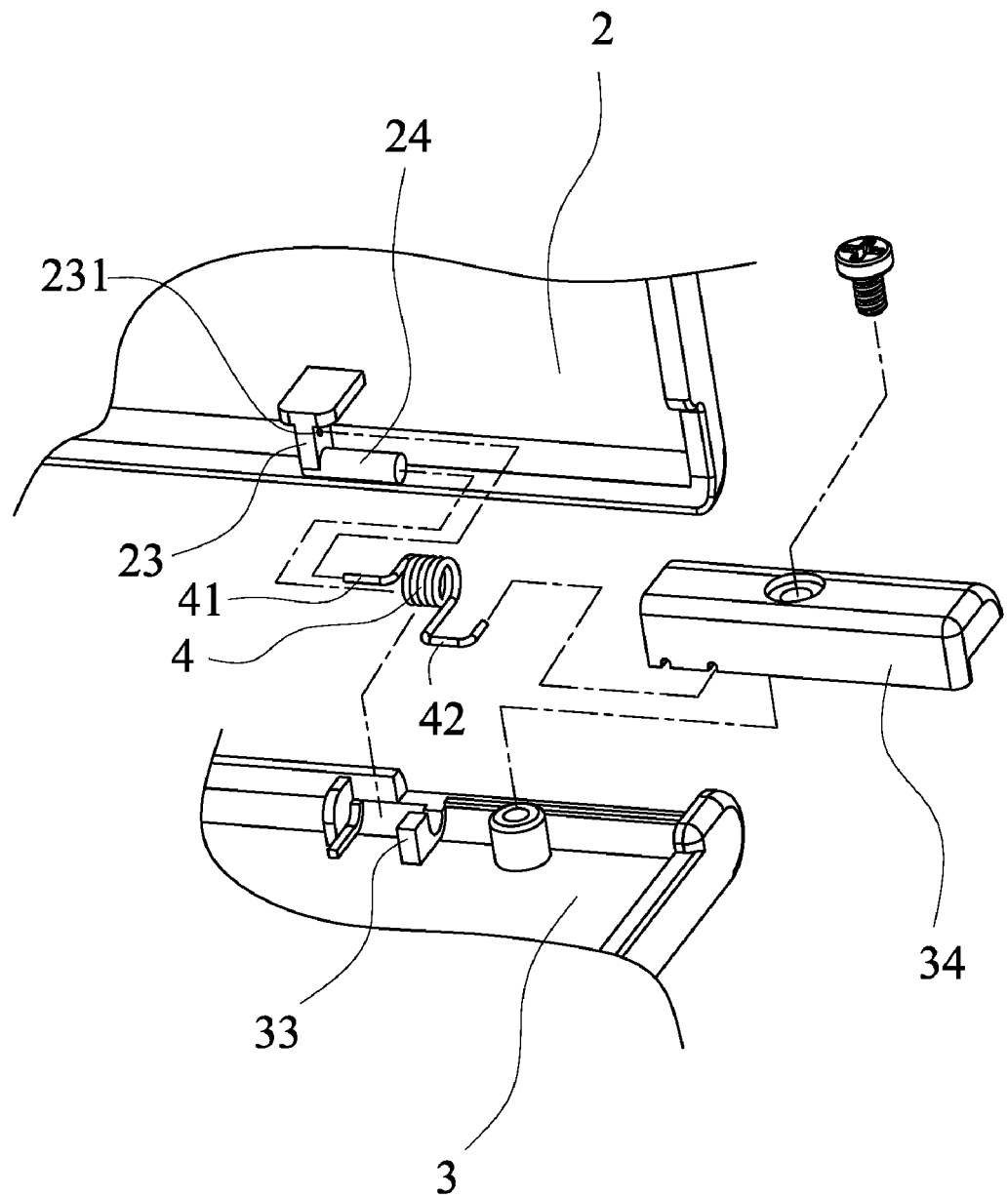
FIG. 3 shows a dissected view of the coupling structure of upper lid and the carrier seat according to the present invention.

The two ends of resilient element 4 are engaged to upper lid 2 and carrier seat 3 respectively. In the present embodiment, resilient element 4 is a button spring, with two ends fixed to upper lid 2 and carrier seat 3. Because there are many types of button springs, the method used to fix the button spring also varies. FIG. 3 shows an exemplary embodiment. As shown in FIG. 3, the inner wall of upper lid 2 includes a support plate 23, fixed to an axis 24. Support plate 23 has a hole 231. The corresponding inner wall of carrier seat 3 has an axis base 33 and an axis cover 34. When assembled, resilient element 4 (button spring) is sheathed on outside of axis 24. The first line end 41 of button spring 4 is plugged into hole 231. Then, axis 24 of upper lid 2 is placed on axis base 33, and axis base 33 and axis cover 34 are aligned and locked. When locking axis cover 34 to axis base 33, second line end 42 of button spring 4 is also clamped tightly by the locking. In this manner, the two ends of resilient element 4 are engaged to upper lid 2 and carrier seat 3.

The following describes the actual application of the present invention.

Figure 4:
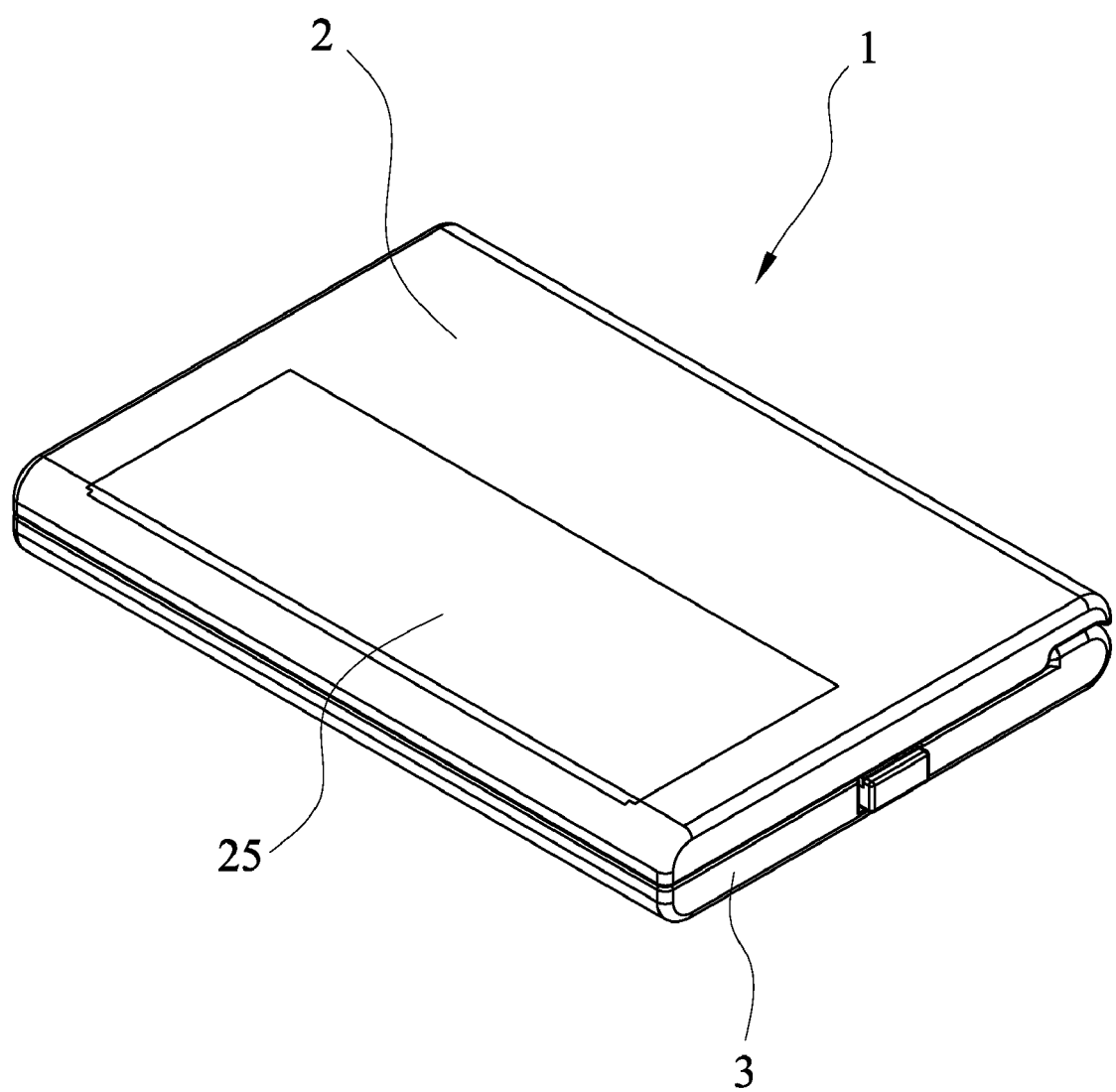
FIG. 4 shows a schematic view of the present invention in closed state.

As shown in FIG. 4, before use, upper lid 2 covers carrier seat 3 so that holding apparatus has the shape of a closed thin box. In this state, resilient element 4 is slightly compressed.

Figure 5:
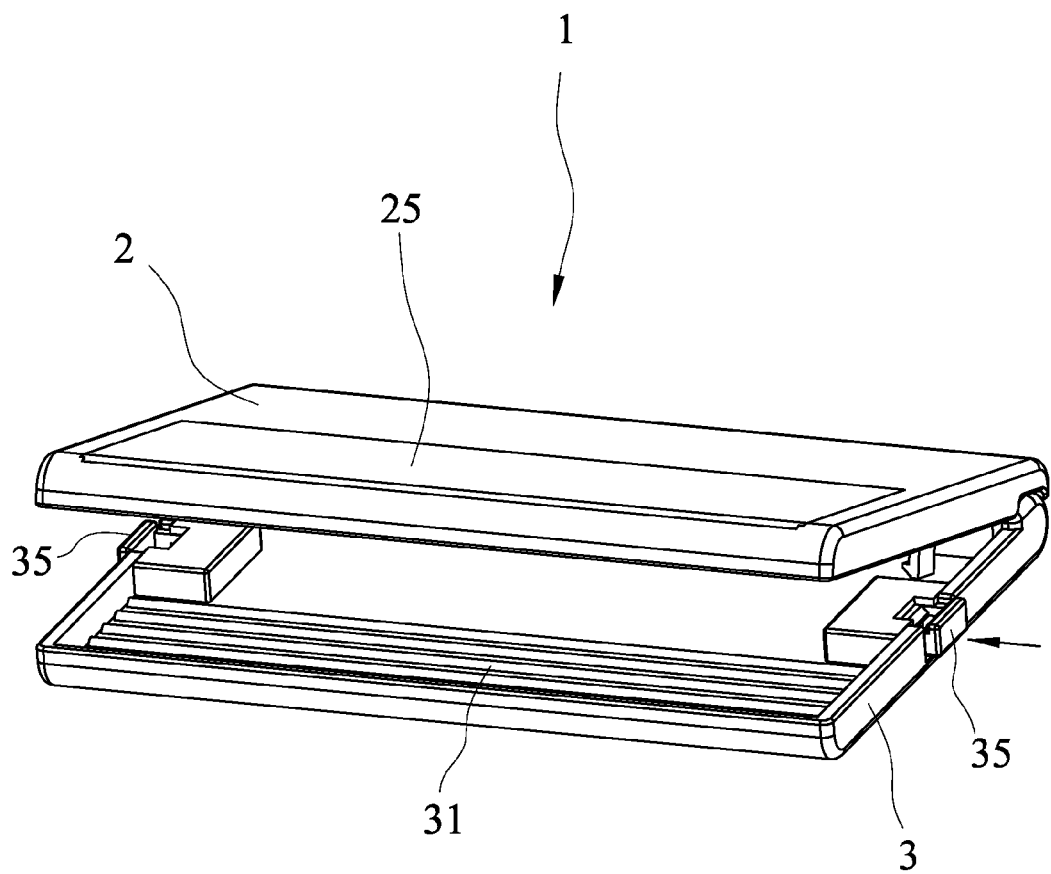
FIG. 5 shows a schematic view of the present invention in initial slightly open state.

As shown in FIG. 5, touching buttons 35 on both sides of carrier seat 3 will unlock the buckle set inside carrier seat 3. Upper lid 2 is slightly opened because of the force of resilient element 4. The angle of opening is less than the normal holding angle when clamping an electronic device. In the present embodiment, the angle is set to be 15°-20°. At this point, resilient element 4 is in the state of no external force. In other words, when holding apparatus 1 is closed or open, resilient element 4 is either slightly compressed or slightly stretched.

Figure 6:
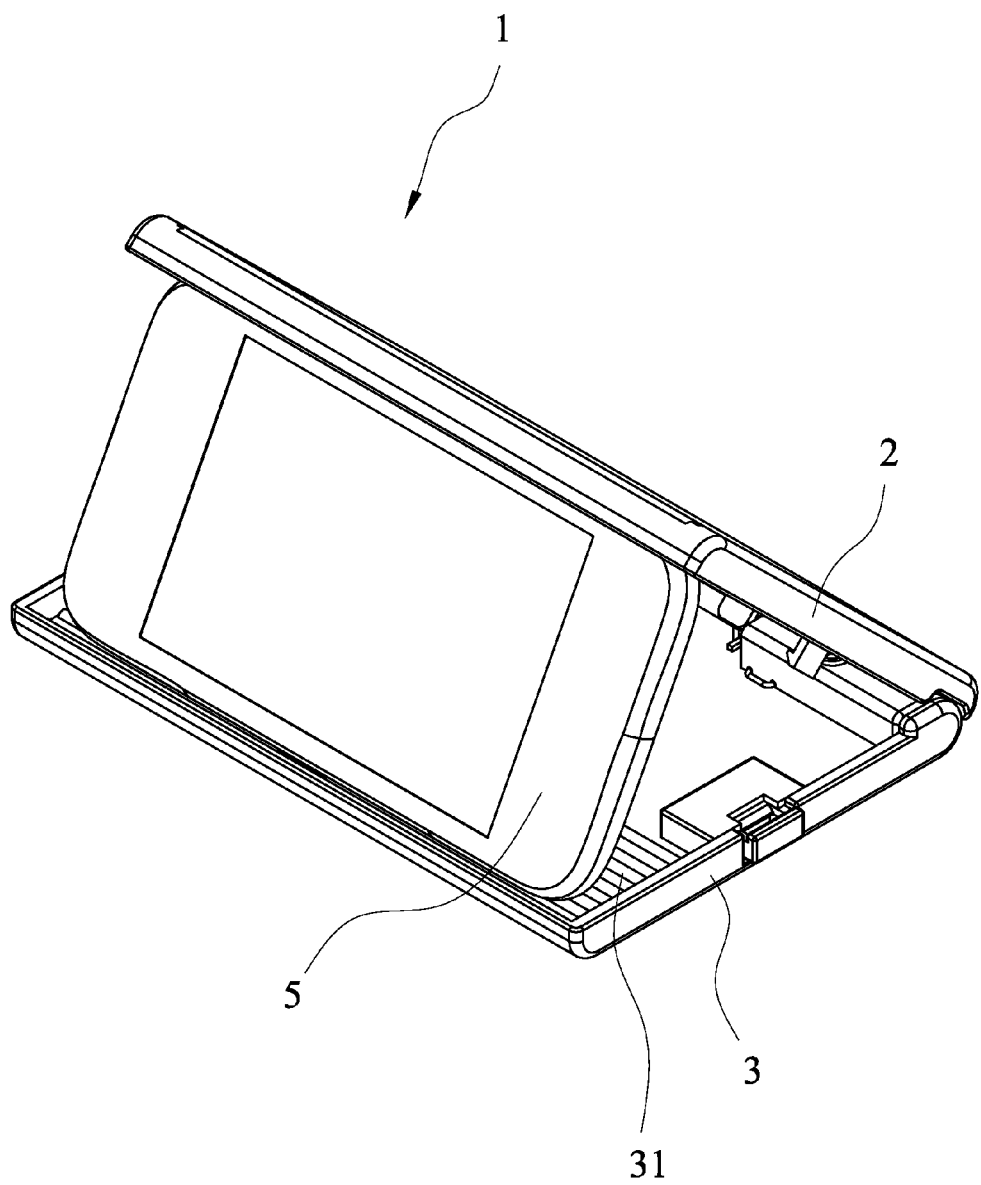
FIG. 6 shows a schematic view of the present invention holding an electronic device.
Figure 7:
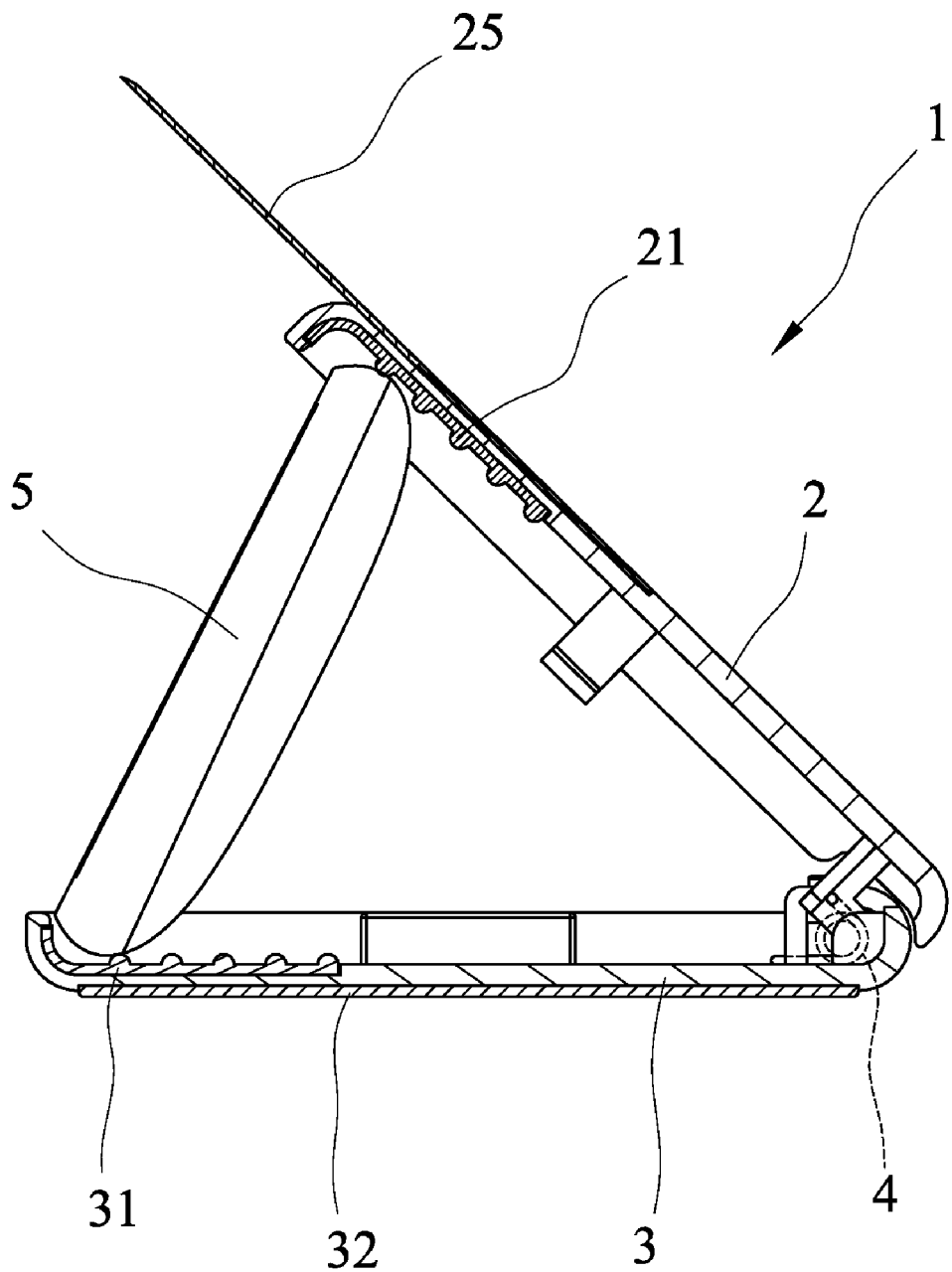
FIG. 7 shows a cross-section view of the present invention in another actual application.

Refer to FIG. 6. When holding apparatus 1 clamps an electronic device 5, the bottom edge of electronic device 5 can be first placed on positioning element 31 of carrier seat 3 via the opening between upper lid 2 and carrier seat 3 as shown in FIG. 5. Then, by pushing upper lid 2 upwards to overcome the force of resilient element 4, the top edge of electronic device 5 is moved inside of upper lid, as shown in FIG. 7, so that maintaining element 21 of upper lid 2 and positioning element 31 of carrier seat 3 touch the top edge and the bottom edge of electronic device 5, respectively. Combined with the force of resilient element 4 to restore, electronic device 5 is held inside holding apparatus 1 with a tilted angle.

Because the present invention uses upper lid 2 to tightly clamp the top edge of electronic device 5, the large-area upper lid 2 can provide good shielding effect from the sun so that the user can read the display of the electronic device easily. Further, as shown in FIG. 5 and FIG. 7, the top surface of upper lid 2 can further include a shielding board 25, able to move away from the coupling edge of upper lid 2 and beyond the opposite edge to provide additional shielding.

In summary, when a smart phone is clamped inside the present invention, the overall center of mass is low and the overall apparatus is stable when placed on the top platform of the dash board. Anti-slip layer 32 at the bottom of carrier seat 3 also provides additional anti-slip effect. In addition to clamping, upper lid 2 can also provide shielding capability for the user to read the information on the display of the electronic device easily. When the smart phone is not in use, the smart phone can be placed between upper lid 2 and carrier seat 3 for better protection.

Figure 8:
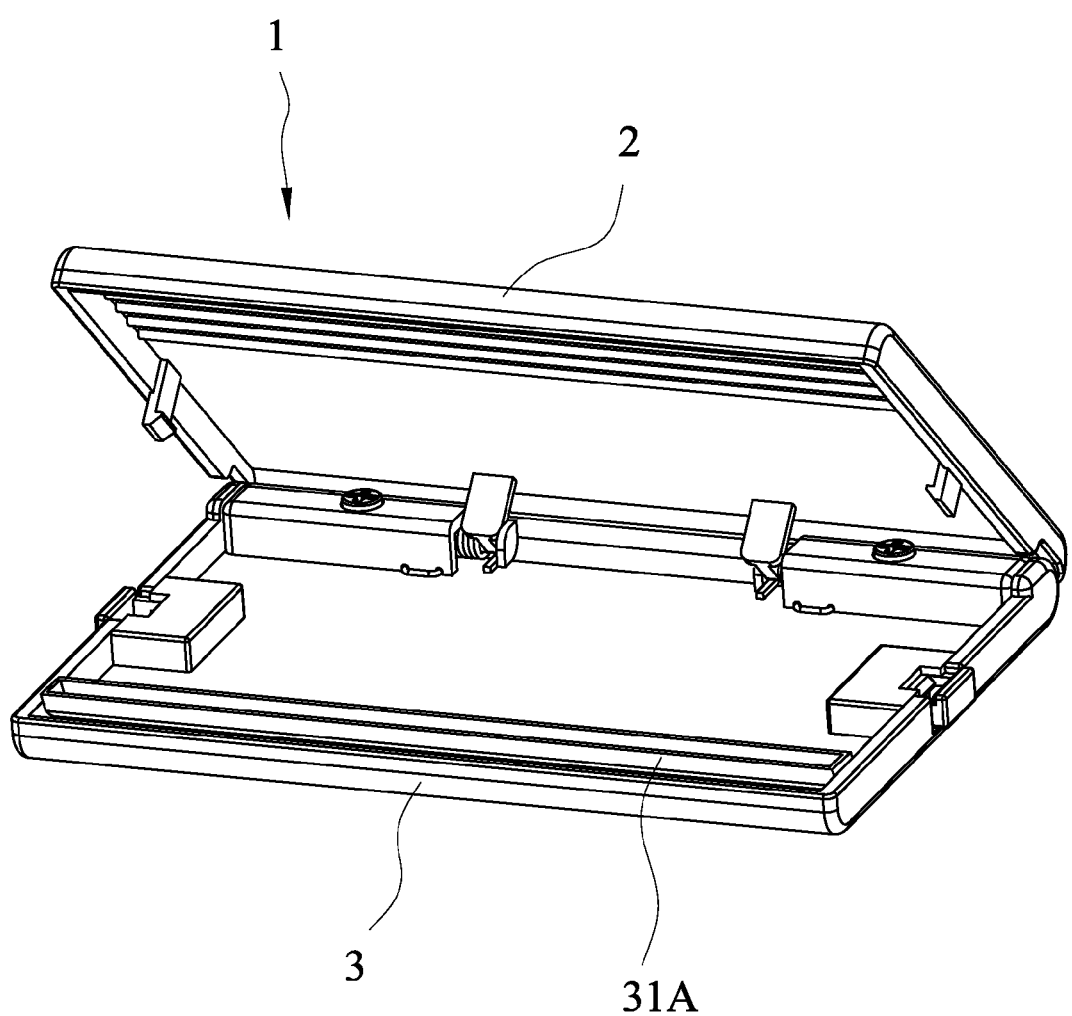
FIG. 8 shows a schematic view of the second embodiment of the present invention.

FIG. 8 shows a schematic view of the second embodiment of the present invention. The structure of positioning element is enhanced in this embodiment. Positioning element 31A is a trench base capable of adjusting angle. The trench base is coupled to carrier seat 3. In the present embodiment, the trench base is coupled to carrier seat 3 at both sides. The shape of the trench base is similar to the bottom shape of the electronic device. When in use, the bottom edge of the electronic device is placed inside trench base to ensure the bottom edge of the electronic device will not shift when clamped. Also, trench base can also rotate around the coupling points on both sides for tilted angle adjustment. Furthermore, the inside of the trench base can further include a connector for electrical connection to the electronic device when holding the electronic device for convenient connection to external power source for a wide range of applications.

Figure 9:
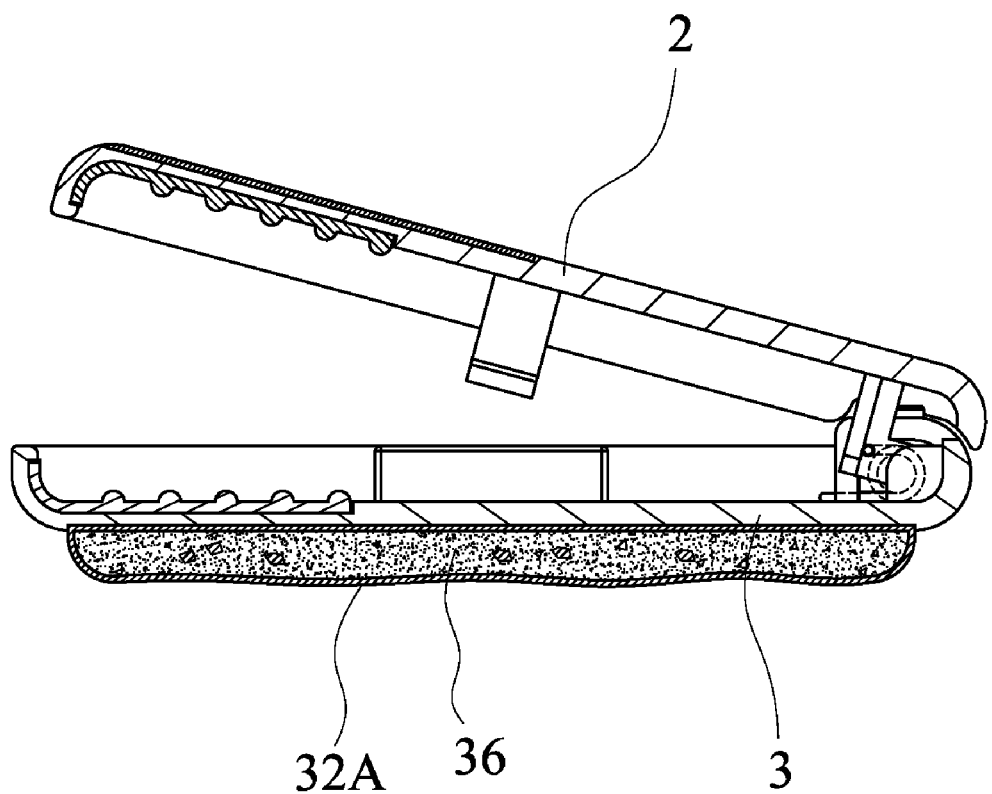
FIG. 9 shows a cross-sectional view of the third embodiment of the present invention.

FIG. 9 shows a schematic view of the third embodiment of the present invention. The structure of anti-slip layer 32A is enhanced in this embodiment. Anti-slip layer 32A is still located at the bottom surface of carrier seat 3. However, the inside of anti-slip layer 32A is filled with heavy object 36, such as, sand, gravel, or metal powder. The heavy object inside anti-slip layer 32A can increase the friction to enhance the anti-slip capability.

Figure 10:
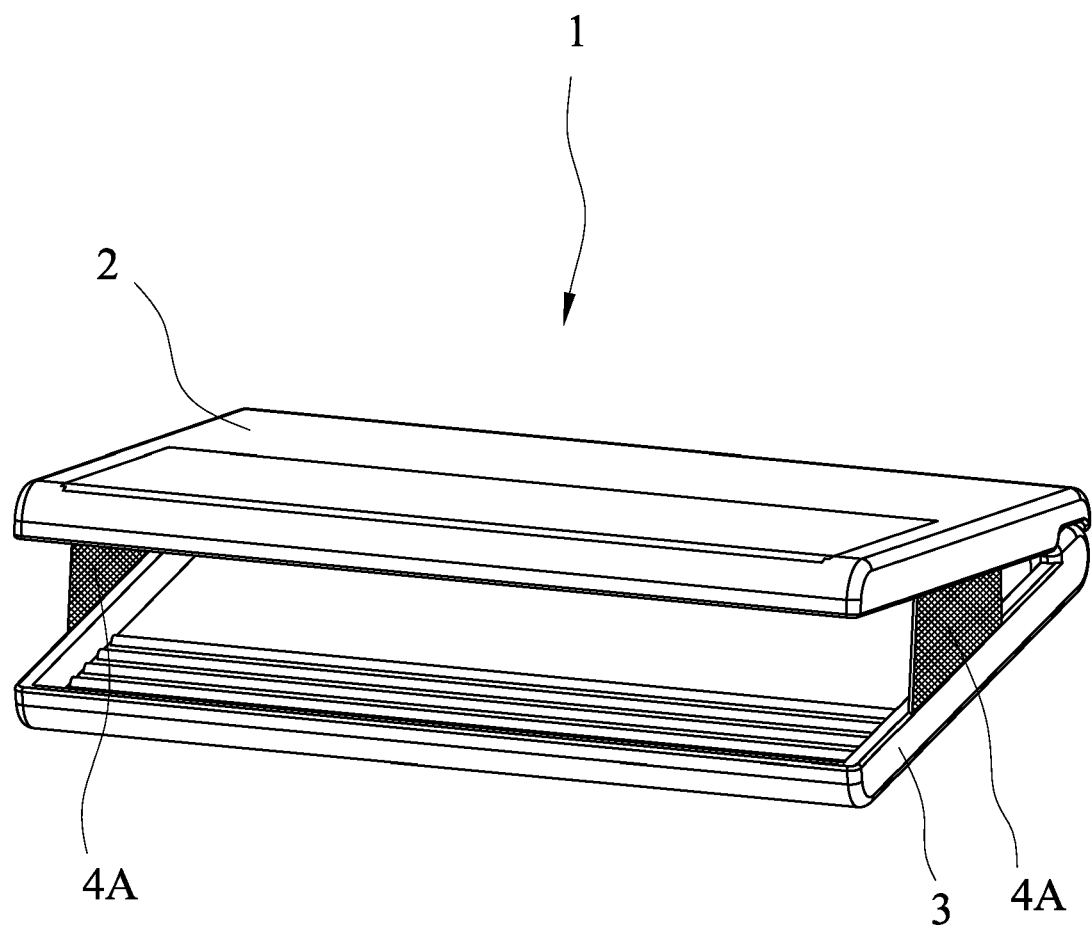
FIG. 10 shows a schematic view of the fourth embodiment of the present invention.

Resilient element 4 of the present invention is to provide a force so that upper lid 2 and carrier seat 3 can incline towards each other. Resilient element 4 is not limited to be a button spring shown in the embodiment. FIG. 10 shows a schematic view of the fourth embodiment of the present invention. In this embodiment, resilient element 4A can be an elastic band, with two ends engaged to upper lid 2 and carrier seat 3, respectively. However, the location of engagement is on the left and right sides of upper lid 2 and carrier seat 3, perpendicular to the coupling side of upper lid 2 and carrier seat 3.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for holding an electronic device, comprising:
    a carrier seat at a bottom of said apparatus, a facing surface of said carrier seat having a positioning element and a bottom of said carrier seat having an anti-slip layer;
    an upper lid at a top of said apparatus, said carrier seat and said upper lid being engaged by a coupling on one side so that said upper lid is able to rotate along the coupling side to open or close, and a corresponding facing surface of said upper lid having a maintaining element, said maintaining element being a wavy element with a plurality of valleys and a plurality of peaks formed thereon; and
    at least a resilient element, two ends of said resilient element being engaged to said upper lid and said carrier seat respectively to provide a force so that said upper lid and said carrier seat are able to incline towards each other;
    wherein said positioning element and said maintaining element are located on a side away from the coupling side for holding said electronic device, a bottom edge of said electronic device is positioned on said positioning element, and a top edge of said electronic device is maintained on one of said plurality of valleys of said maintaining element so as to prevent shifting of said electronic device and hold said electronic device inside said apparatus with a tilted angle when said electronic device is held in use.

2. The apparatus as claimed in claim 1, wherein said resilient element comprises a spring.

3. The apparatus as claimed in claim 1, wherein said maintaining element is made of anti-slip material with good anti-slip capability.

4. The apparatus as claimed in claim 1, wherein said positioning element is a wavy element with a plurality of valleys and a plurality of peaks formed thereon, and said bottom edge of said electronic device is positioned on one of said plurality of valleys of said positioning element when said electronic device is held in use.

5. The apparatus as claimed in claim 1, wherein said positioning element is made of anti-slip material with good anti-slip capability.

6. The apparatus as claimed in claim 1, wherein said positioning element has at least a bend segment to prevent said electronic device from sliding out of an opening of said apparatus when said electronic device is held in use.

7. The apparatus as claimed in claim 1, wherein said positioning element is a trench base capable of adjusting its angle, said trench base is coupled to said carrier seat for positioning and holding said electronic device.

8. The apparatus as claimed in claim 1, wherein said anti-slip layer at bottom of said carrier seat is made of anti-slip material with good anti-slip capability.

9. The apparatus as claimed in claim 1, further comprising a shielding board on top of said upper lid, said shielding board is able to move away from the coupling side of said upper lid and beyond an opposite side of the coupling side to provide shielding from sun.

10. The apparatus as claimed in claim 1, wherein said anti-slip layer is filled with heavy objects, said heavy objects can be at least one of sand, gravel or metal powder.

11. The apparatus as claimed in claim 1, wherein said resilient element is an elastic band with two ends engaged to said upper lid and said carrier seat, respectively.

* * * * *